US009200243B2

(12) United States Patent
Mosier et al.

(10) Patent No.: US 9,200,243 B2
(45) Date of Patent: Dec. 1, 2015

(54) HYBRID TECHNIQUE FOR THE CONVERSION/REMOVAL OF CONTAMINANTS IN ALCOHOL-WATER OR LIKE MEDIUM

(71) Applicant: Persedo LLC, Pearland, TX (US)

(72) Inventors: Benjamin Mosier, Houston, TX (US); Greg George, Champaign, IL (US)

(73) Assignee: PERSEDO LLC, Pearland, TX (US)

( * ) Notice: Subject to any disclaimer, the term of this patent is extended or adjusted under 35 U.S.C. 154(b) by 1 day.

(21) Appl. No.: 14/212,474

(22) Filed: Mar. 14, 2014

(65) Prior Publication Data

US 2014/0287110 A1  Sep. 25, 2014

Related U.S. Application Data

(60) Provisional application No. 61/783,201, filed on Mar. 14, 2013.

(51) Int. Cl.
*C12G 3/08* (2006.01)
*C12H 1/16* (2006.01)
*C10L 3/10* (2006.01)

(52) U.S. Cl.
CPC *C12G 3/08* (2013.01); *C12H 1/165* (2013.01); *C10L 3/106* (2013.01); *C10L 2290/08* (2013.01); *C10L 2290/12* (2013.01)

(58) Field of Classification Search
CPC .............. C12G 3/00; C12G 3/08; C12H 1/12; C12H 1/14; C12H 1/16; C12H 1/165; C10L 2290/08; C10L 2290/12; C10L 2290/34; B01D 19/0073; B01D 19/0078; B01D 47/02; B01D 47/021; B01D 49/006
USPC .............. 203/23, 39, 40, 49, 63, 91; 426/234, 426/237, 238, 247, 474, 592; 95/29, 30, 95/160, 175, 241, 246, 263
See application file for complete search history.

(56) References Cited

U.S. PATENT DOCUMENTS 5,372,634 A * 12/1994 Monahan ........................ 96/175
5,778,763 A    7/1998 Ford, Sr.
(Continued)

OTHER PUBLICATIONS

V.L. Singleton & Diana E. Draper, Ultrasonic Treatment with Gas Purging as a Quick Aging Treatment for Wine, 14 Am. J. Enology Viticulture 1, pp. 23-35.*

(Continued)

*Primary Examiner* — Prem C Singh
*Assistant Examiner* — Brandi M Doyle
(74) *Attorney, Agent, or Firm* — Marshall, Gerstein & Borun LLP

(57) ABSTRACT

Apparatus and process for removing and/or converting contaminants in water-miscible organic solvent mixtures by surface interaction effects to forms less objectionable with lesser metabolic impacts for humans. The process both changes distillation entrapped contaminant compounds in-situ and effects removal of the compounds and their reaction products. In what follows, water-miscible-organic-solvent and water mixtures can be substituted for alcohols. The alcohol to be treated is placed in a ventilated vessel leaving room for head space. Contaminant free air or a specific organic-contaminant-free gas is injected into or otherwise placed in contact with the alcohol. A vacuum is pulled within the vessel, which draws the gas through the alcohol into the head space creating gas bubbles. Energy within a specified range of frequencies is imparted to the fluid causing cavitation and reaction. Wetting, solvent polarity characteristics and pressure are fixed or varied dynamically during processing, and inert or reactive gases are added. Reacted and unreacted contaminants enter the bubble cavities and are swept from solution.

13 Claims, 7 Drawing Sheets

(56) References Cited

U.S. PATENT DOCUMENTS

| | | |
|---|---|---|
| 6,019,034 A | 2/2000 | Ford, Sr. |
| 7,063,867 B2 | 6/2006 | Tyler, III et al. |
| 2013/0330454 A1* | 12/2013 | Mahamuni .................. 426/238 |

OTHER PUBLICATIONS

Anschuetz et al., OC-10: The Separation of Azeotropic Mixtures by Ultrasounds-Assisted Distillation, *13$^{th}$ Meeting of the European Society of Sonochemistry*, 51-2 (2012).

* cited by examiner

HYBRID TECHNIQUE FOR THE CONVERSION/REMOVAL OF CONTAMINANTS IN ALCOHOL-WATER OR LIKE MEDIUM

FIELD OF THE DISCLOSURE

This disclosure relates generally to the purification of liquids by surface interaction effects and, more specifically, to an apparatus and process of treating for converting contaminants in alcohols to forms less objectionable to humans. One use of this apparatus and process is to remove from drinking alcohol contaminants, including congeners, which cause hangovers and illness in humans; the removal of contaminants from drinking alcohol also modifies its taste to humans. Another application is in the production of ethanol, with reduced levels of co-distilling fermentation-by products, for use as an oxygenate in fuels. Not only can this apparatus and process remove objectionable fermentation by-, but it can also minimize, eliminate or supplement the costly processes of distillation, azeotropic distillation using added solvents, reverse osmosis and molecular-sieve adsorption, as well as other industrial separation techniques. After treatment, the proof of the treated alcohol is not appreciably decreased. The process both represents a fundamentally new approach to trace purification and removal of contaminants and is now capable of directly producing saleable beverage and industrial ethanol products.

During conventional distillation, hydrogen bonding and solvent-solute interactions tend to hold and entrain certain contaminants in ethanol or ethanol-water mixtures even at temperatures and pressures where they would be expected to boil off. Depending on the relative ratio of ethanol to water, a water in oil micro-emulsion may result. This micro-emulsion may consist of clusters of water molecules entrained in an ethanol shell, the thermodynamic stability of which is assured by hydrogen bonding. Congeners of varying hydrophobicity may be entrained in these structures, which have a non-polar to polar transitional region which is the interface between the ethanol and the water. For example, isomers of amyl alcohol, with boiling points of 102 to 138.5 degrees C., which make up the bulk of the undesirable fusel alcohols or fusel "oils" which are fermentation by-products, are not fully removed by conventional distillation even when temperatures exceed their boiling points. These compounds are toxic and give undesirable taste and odor to drinking alcohols. The proton of the hydroxyl group on these alcohols has an affinity for electrons from the negatively charged oxygen in both the water molecule and ethanol molecule. The same effect occurs in the ethanol-water solution itself, between ethanol and water, as shown in the figure. This effect is responsible for the "constant boiling mixture", "eutectic" or "azeotrope" which results from an effort to dry ethanol by distillation—water levels cannot be reduced to below about 5% v/v.

Some investigators believe that clathrates, consisting of shells of water molecules surrounding ethanol molecules (oil-in-water) or ethanol molecules surrounding water molecules (water-in-oil) may form, even at room temperatures, consisting of nano-scale clusters of molecules in solution. Further, some investigators claim that ethanol-water clathrates in vodka, for example, control the organoleptic response of the nose and pallete to the beverage. One can understand that the internal regions of these molecular clusters, which represent nano-emulsions and may be thought of as micelles: 1) represent micro-encapsulants and may have interiors which are largely isolated from the bulk solution; 2) may have a different hydrophobicity internally then externally (i.e., may represent micro-droplets of oil-in-water, or water-in-oil; and 3) because of their internal chemistry may solubilize congeners more or less strongly than in the bulk solution.

Conventional distillation cannot remove many congeners, fermentation by-products and contaminants, because the emulsions are not broken. Conventional gas stripping (such as in the Ford methods cited below) can only partially remove many congeners, fermentation by-products and contaminants for the same reason. As is evident visually during process runs with the preferred embodiment, emulsions are broken in the disclosed process. For example the opacity of an oily suspension, such as that of an early tequila distillation, is eliminated or reduced. In addition, the hydrophilicity of the solutions change during treatment, such that on draining the system, the solution holds tightly to and wets the glass walls of the outlet tube where it did not do so on filling, having become more hydrophilic. During application of energetics in the frequency ranges described, transient cavitation occurs in the liquid, in which microscopic voids form in solution which are not empty and which may contain vaporized parts of the mixtures, including congeners, ethanol and water. These voids have very short lifetimes (microsends) and their explosive collapse leads to extremely high reported transient temperatures (as high as 3400 K, rapidly decreasing due to heat dissipation into the surrounding solution).

These very high pressure regions represent areas of possible extractive and reactive chemistry, as the reactive gases introduced in the preferred embodiment react with congener. In addition, hydroxyl and superoxyl radicals (free electrons) are known to be produced by this collapse. For example, hydrogen peroxide was reported by our own investigators to be found at trace levels in identically energetically treated waters, using a sensitive fluorescence technique. This effect likely gives rise to reaction products of the extractive gas and free radicals. Further, the shock waves caused by the collapse likely disrupt, and likely invert, water-in-oil emulsions creating oil-in-water emulsions, which expose congeners residing at the transitional polarity interface transiently to the bulk solution. At this point, congener held in solution by solute-solvent and hydrogen bonding effects is permitted to pass through the walls of the gas bubbles created in one embodiment of the method and held for long residence times in the standing wave in the vessel. Once exchanged from into the vapor phase in bubble cavities by the new, transiently established gas-liquid equilibrium, these freed congeners are swept from solution by the buoyancy of bubbles which explode at the surface, releasing their contents into the swept headspace. Water molecules themselves may be selectively removed, and water is sometimes found in the outlet trap of the preferred embodiment. Alternatively, the inversion mechanism may be reversed for the removal of water from alcohols (oil-in-water going to water-in-oil). This effect is elegantly demonstrated below in the successful drying of an industrial glycol mixture from which water cannot be removed conventionally, but ejecting clusters of consolidated water.

BACKGROUND OF THE DISCLOSURE

Ethanol, also called ethyl alcohol, pure alcohol, grain alcohol, or drinking alcohol, is a volatile, flammable, colorless liquid. It is a psychoactive drug and one of the oldest recreational drugs. Best known is the type of alcohol found in alcoholic beverages, but it is also used as a solvent, and as fuel oxygenate for gasolines, biofuels and biodiesel.

Ethanol has widespread use as a solvent of substances intended for human contact or consumption, including scents, flavorings, colorings, and medicines. In chemistry, it is both an essential solvent and a feedstock for the synthesis of other products. It has a long history as a fuel for heat and light, and more recently as an additive to fuel for internal combustion engines intended to reduce airborne pollutants.

The fermentation of sugar into ethanol is one of the earliest organic reactions employed by humanity. The intoxicating effects of ethanol consumption have been known since ancient times. The process of culturing yeast under conditions to produce alcohol is called fermentation. This process is typically carried out at temperatures of around 35-40° C. The toxicity of ethanol to yeast limits the ethanol concentration obtainable by brewing. The most ethanol-tolerant strains of yeast can survive up to approximately 15% ethanol by volume. To produce ethanol from starchy materials such as cereal grains, the starch must first be converted into sugars. In brewing beer, this has traditionally been accomplished by allowing the grain to germinate, or malt, which produces the enzyme amylase. When the malted grain is mashed, the amylase converts the remaining starches into sugars. For fuel ethanol, the hydrolysis of starch into glucose can be accomplished more rapidly by treatment with dilute sulfuric acid, fungally-produced amylase, or some combination of the two. Cellulosic ethanol follows the same pathway, but requires steam and enzyme pre-treatment of the undigestible lignocelluloses.

Congeners are objectionable chemicals that are formed during fermentation. Some beverages have more congeners than others. In drinking alcohol, particularly in darkly colored liquors such as beer, wine, rum and cordials, these congeners are responsible for headaches and hangovers, but they also add taste and aroma to the liquors.

Complex organic molecules such as acetaldehyde, formaldehyde, methanol and acetone are found in some alcoholic beverages and are said to be principally responsible for hangovers, in addition to the ethanol itself. Manufacturers (distillers) of adult beverages have for years strived to remove congeners from drinking alcohol because of their metabolic impacts and off-flavors and odors. However, the processes utilized for this purpose, such as distillation, oxidation, low- or high-frequency cavitation and the like, are energy consuming and also tend to remove significant quantities of ethanol, venting toxic and otherwise objectionable compounds into the atmosphere. As much as 30% of beverage ethanol is lost with the requirement of multiple distillation steps to remove congeners for a high end vodka, for example. The system is also demonstrated to be capable of removing polyaromatic (i.e., naphthalene and phenanthroline-like) residuals from activated carbon treatment of vodka, bourbon whiskey, scotch and other beverages.

Congeners also pose considerable challenges for makers of corn or grain ethanol. Fusel oils (mixtures of higher alcohols such as propyl, butyl, and amyl alcohols and their isomers) can be very difficult to remove from the azeotrope. The uncontrolled release of volatile fermentation by-products such as acetaldehyde results in millions of dollars in fines yearly for ethanol distillers. In addition, the congeners irreversibly foul the zeolite molecular sieves used to dry 190 proof ethanol for use in fuels, resulting in high maintenance cycle costs. Removal of these contaminant congeners prior to drying will dramatically reduce costs for zeolite replacement, minimize waste disposal expense and improve product quality. Congeners not removed during distillation and left in the "backset", the product water returned to the mash, can be toxic to yeast. Finally, congeners which are not removed during distillation are burned in the internal combustion engine when 200 proof dried ethanol is used as an oxygenate, possibly being converted to more toxic products as air pollution or exhausted unchanged as urban air pollution.

Extensions of the technology will include ultraviolet radiative treatment, which produces large numbers of free radicals and will treat multi-ring and polyphenolic compounds and tannins in darker spirits, electrokinetic treatment effecting oxidation/reduction reactions and radiofrequency treatment for dis-agglomeration, de-emulsification and de-stabilization. Large scale energetic reactors employing various technical means of delivering energy may be employed, including flow-through and re-circulating designs.

DESCRIPTION OF THE RELATED ART

U.S. Pat. Nos. 5,778,763 and 6,019,034 (Ford, C.), and U.S. Pat. No. 7,063,867 (Tyler et al.) describe methods attempting to purify alcohols, and the processes referenced in such patents. U.S. Pat. Nos. 5,778,763 and 6,019,034 disclose that the application of high negative pressure to pull air bubbles through alcoholic beverages is a means to evacuate contaminants. The apparatus and method of the present disclosure represent an effort to address some shortcomings of this technology, including: 1) the lack of in situ process reactions leading to production of a contaminated exhaust which on the industrial scale would require costly remediation as it may pose an environmental hazard; and 2) the significant loss of the solvating alcohol (in this case ethanol) from the solution resulting in high operational costs due to product losses. The apparatus and method discussed herein resolves these issues by converting many contaminants in situ rather than evacuating them from the reaction vessel via the gaseous phase along with solvent. Because the exhaust of the apparatus and methodology of the present disclosure does not carry significant quantities of solvent, no large loss of the ethanol is observed. U.S. Pat. No. 7,063,867 discloses that the application of simple ultrasonic energy to alcoholic beverages which enhances the rate at which aging of the beverage takes place. U.S. Pat. No. 7,063,867 states that ultrasonic energy is applied at a power of at least about 5 Watts/liter, more specifically between about 10 and about 80 Watts/liter, and the ultrasonic energy should be at a frequency of greater than about 20,000 Hz, more specifically between about 20,000 and about 170,000 Hz. In one embodiment, the ultrasonic energy can be at a frequency greater than about 35,000 Hz, for instance, in one embodiment, the ultrasonic energy can be at a frequency of about 80,000 Hz. U.S. Pat. No. 7,063,867 further discloses that the amount of time the alcohol is exposed to ultrasonic energy can vary depending on process conditions and desired output, but generally, the alcohol can be exposed to ultrasonic energy for at least one hour to accelerate chemical reactions in the consumable alcohol involved in maturation and flavor enhancement of the alcohol, wherein the temperature of the alcohol is maintained between 90 degrees F. and 150 degrees F. while the alcohol is being subjected to the ultrasonic energy.

In an oral presentation from the European Society of Sonochemistry, Jul. 1-12, 2012, in Lviv-Ukraine, Anscheutz et. al. report some enhancement in the separation of methyl-tert-butyl ether from methanol in an azeotropic mixture of the two by ultrasound. The results are strictly empirical, without careful control over system geometry, bubble dynamics, ultrasonic energies, pressures and flow rates, and without the critical contribution of extractive gases. Further, two energetic systems are employed using "indirect" and "direct" ultrasound, an unclear distinction. The investigators state that the mechanism "is unknown" but propose, in an ambiguous statement, "enhanced mass transport of volatile compounds into the bubbles" which is merely a re-statement of the observed result. Further, the effect is described as "unfortunately marginal" with a decrease from 3 to 2 theoretical plates. The investigators using this method did not actually separate the materials of interest or create a product as disclosed herein, but rather demonstrated a simple "shift in the equilibrium curve". The results may be attributed to the simple and long-known effect of ultrasound on breaking emulsions, for which it is implemented in industrial processes and is a simple demonstration of emulsion breaking without practical applications.

Some shortcomings of the technology disclosed in U.S. Pat. No. 7,063,867 include 1) its reliance on the use of catalysts as well as flavor-forming additives to achieve its effect, and 2) its failure to reduce the toxicity of the beverage to which it is applied and also to potentially increase the toxicity by engendering uncontrolled free-radical propagation while also extracting contaminants, such as congeners, from flavor additives. Further, U.S. Pat. No. 7,063,867 does not conduct quantitative chemical testing before and after treatment congener testing of treated beverages in this attempt at an artificial aging process and instead relies on subjective rankings of color, clarity, aroma and taste.

The method and apparatus of the present disclosure resolves these issues by converting contaminants to more flavorful and less objectionable forms without the use of flavor additives from which additional toxic compounds may be extracted. The advanced process of the present disclosure represents an improvement over existing technology in terms of process efficiency, energy savings, product quality, safety and overall cost including capital equipment. The system can operate at bench and pilot scale, in a batch or flow-through reactor, at frequencies between and including 12,000 to 20,000 Hz, depending on whether piezoelectric or magnetostrictive transducers are employed, as understood by those knowledgeable in the art.

SUMMARY OF THE DISCLOSURE

The present disclosure provides an apparatus and process for converting contaminants in alcohols to forms less objectionable to humans. One use of this apparatus and process is to remove from drinking alcohol contaminants, including congeners, which cause hangovers and illness in humans and laboratory test mammals; the removal of contaminants from drinking alcohol also modifies its taste to humans.

A detailed mass balance evidences significant reductions of congener levels upon treatment of various alcohols using the apparatus and method of the present disclosure. These reductions of congener levels are found to be at least as great, and in many cases greater than, the congener level reductions achieved by multiple distillation processes conventionally performed by producers of high-cost (so-called "top shelf") alcohols. Moreover, because the method of the present disclosure does not involve the application and re-application of high levels of heat necessary for those multiple-distillation processes, which leads to significant evaporation losses, employing the method of the present disclosure achieves or exceeds the levels of reductions in congeners of conventional multiple-distillation processes with application of significantly lower levels of heat and only a fraction of the volume loss of the alcohol experienced by those conventional processes. Comparisons to control samples and test samples were conducted according to the methods and employing the apparatus as described in more detail below.

The alcohol to be treated is placed in a ventilated vessel leaving room for head space. Gas1 or a selected gas is injected into the alcohol or otherwise placed in contact with the alcohol. A vacuum is created in the head space within the vessel. The vacuum draws the Gas1 through the alcohol in the form of micro-bubbles of controlled surface area. Energy within a specified range of frequencies is imparted to the fluid. Volatile and semi-volatile contaminants are converted to forms less objectionable to humans and these reaction products and unchanged contaminants are swept out as aerosolized vapor or removed by evaporation at reduced pressure after being freed of solute by an unknown mechanism. Contaminants are treated such that they leave the solution trapped in the bubble cavities. This process likely involves energetic reactions, low-frequency, high-energy disruption of the ethanol-water molecular interface, including ethanol-water clathrate re-structuring above ambient temperatures, and micellular encapsulation and "breaking" of the constant boiling-azeotrope which limits the utility of distillation The apparatus and method of the present disclosure allow distillers and other manufacturers and distributors of alcoholic beverages to convert and/or remove contaminants and thus improve the flavor of the beverage before it is bottled and also allows the option for improvement of the flavor of the beverage after it has been bottled and/or sold. This can be done with ease and without complex distillation apparatus or other costly extraction/separation techniques such as those relying on thermal energy or physical adsorption.

In various embodiments, the apparatus and method of the present disclosure remove one or more of the following congeners: fusel oils, acetaldehyde, 1-propanol, ethyl acetate, 2-methyl-1-propanol, formic acid, -methylpropyl ester, 3-methyl-butanol, 2-methyl-butanol, decanoic acid ethyl ester, acetone, undecane, dodecane, decane, nonanal, dotriacontane, caprolactam, 2-ethylacridine, furfural, propylene glycol, butanoic acid ethyl ester, ethyl lactate, acetic acid, phenyl ethyl alcohol, industrial contaminant 1,4-dioxane, or any of the congeners listed in the Detailed Description. It is contemplated that the level of one or more of the congeners in the alcohol, including but not limited to those described above, are reduced by about 100%, 95%, 90%, 85%, 80%, 75%, 70%, 65%, 60%, 55%, 50%, 45%, 40%, 35%, 30%, 25%, 20%, 15%, 10% or 5%. It is further contemplated that the total level of congeners in the alcohol, including but not limited to those described above and in the Detailed Description, is reduced by about 100%, 95%, 90%, 85%, 80%, 75%, 70%, 65%, 60%, 55%, 50%, 45%, 40%, 35%, 30%, 25%, 20%, 15%, 10% or 5%.

The apparatus and method of the present disclosure achieves purification of alcohol products without multiple distillation steps and with negligible losses of alcohol. In various embodiments, the disclosure provides that the alcohol levels are not reduced by more than about 15%, 14%, 13%, 12%, 11%, 10%, 9%, 8%, 7%, 6%, 5%, 4%, 3%, 2%, 1% or 0.5%.

In one embodiment of the method, there is less than 25% alcohol loss during performance of an iteration of the method. In various embodiments, the alcohol treated by the method comprises fewer impurities with less than 25% alcohol loss during performance of the method when compared to standard alcohol distillation methods. It is contemplated that the amount of alcohol lost using the present method is less than about 20%, 15%, 10%, 5%, 4%, 3%, 2%, 15, or 0.5%.

In one embodiment, the method is carried out a temperature set at 35° C.±3° C.

In various embodiments, the acoustic energy is applied for less than about 60 minutes. In various embodiments, the acoustic energy is applied for less than 50, 40, 30 or 20 minutes. It is contemplated that the acoustic energy applied is between about 1 Hz and 10 Hz.

In various embodiments, the level of alcohol congeners removed by the present method is greater than the levels removed over 1, 2, 3, or 4 rounds of a standard alcohol distillation process. In one embodiment, at least 50% of congeners are removed. In one embodiment, at least 50% of fusel oils are removed.

It is contemplated herein that, in one embodiment, the alcohol used in the method is a glycol composition. In various embodiments, the glycol composition comprises less than 0.2% water at the completion of the method. Exemplary glycol compositions include, but are not limited to, triethylene glycol (TEG), diethylene glycol (DEG), ethylene glycol (MEG), tetraethylene glycol (TREG) and tripropylene glycol.

Also provided by the disclosure is an alcohol treated, purified or prepared by the method described herein. Further contemplated is a dehydrated glycol composition prepared by the method that comprises less than 0.2% water content.

In one embodiment, the disclosure provides a purified alcohol composition having a decreased level of congener contaminants wherein the contaminants are removed by conversion of an oil-in-water emulsion in the alcohol to a water-in-oil emulsion, by applying acoustic wave energy at a temperature of 35° C.±3° C. for less than 60 minutes, thereby removing congeners from the alcohol. In various embodiments, the acoustic energy is applied for less than 50, 40, 30 or 20 minutes.

In one embodiment, the level of alcohol congeners in the composition is lower compared to the levels in an alcohol compositions prepared by 1, 2, 3, or 4 rounds of a standard alcohol distillation process. In various embodiments, at least 50% of congeners are removed. It is further contemplated that the total level of congeners in the alcohol, including but not limited to those described above and in the Detailed Description, is reduced by about 100%, 95%, 90%, 85%, 80%, 75%, 70%, 65%, 60%, 55%, 50%, 45%, 40%, 35%, 30%, 25%, 20%, 15%, 10% or 5%.

In various embodiments, at least 50% of fusel oils are removed from the alcohol composition. It is further contemplated that the level of one or more of the congeners in the alcohol, including but not limited to those described above, are reduced by about 100%, 95%, 90%, 85%, 80%, 75%, 70%, 65%, 60%, 55%, 50%, 45%, 40%, 35%, 30%, 25%, 20%, 15%, 10% or 5%.

The apparatus and method of the present disclosure permits trapping and capturing of expelled contaminants and reaction products that may have commercial value for conversion to saleable products, or for disposal. The apparatus and method of the present disclosure are also demonstrated to be capable of removing polyaromatic (i.e., naphthalene and phenanthroline-like) residuals from activated carbon treatment of vodka, bourbon, whiskey, scotch and other beverages.

BRIEF DESCRIPTION OF THE SEVERAL VIEWS OF THE DRAWINGS

A better understanding of this invention can be obtained when the following detailed description of the preferred embodiment is considered in conjunction with the following drawings, in which.

DETAILED DESCRIPTION OF THE PREFERRED EMBODIMENTS

Figure 1:
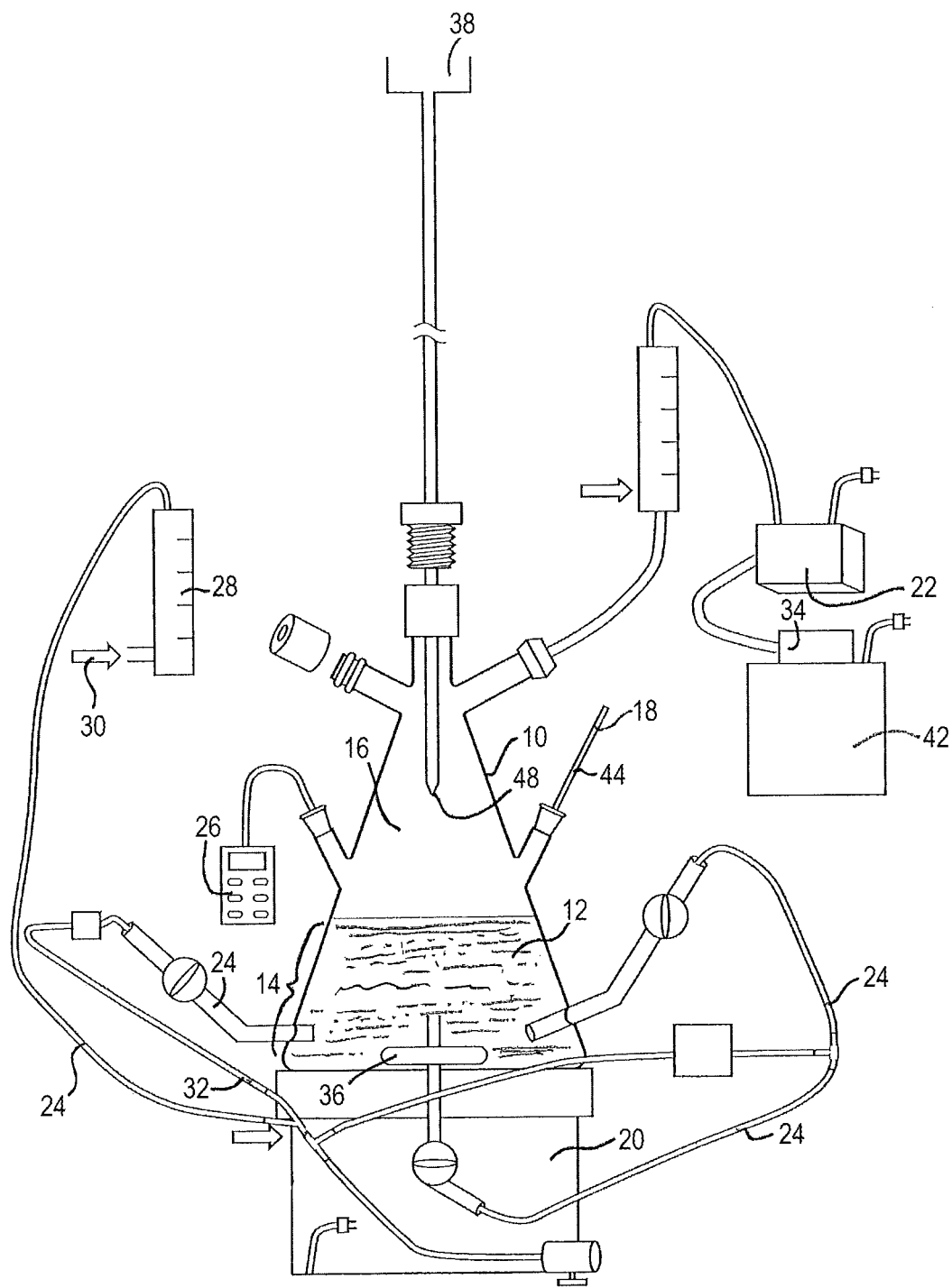
FIG. 1 is an elevation view, taken partially in cross-section, of an apparatus according to the present disclosure for injecting a gas into a vessel containing alcohol, drawing a vacuum on the vessel, and imparting energy in a specified range of frequencies to the contents of the vessel.

With reference to FIG. 1 of the drawings, an apparatus is illustrated according to the present disclosure for treating alcohol to remove and/or convert fuel oxygenate contaminants and remove and/or convert beverage congeners to a form less objectionable to humans. The alcohol is placed in a sealed reaction vessel 10. As will be set forth, the apparatus treats the alcohol to convert contaminants to other forms and/or remove them from solution. When the apparatus is used to treat drinking alcohol, it converts and/or removes contaminants, such as undesirable congeners, which otherwise give the liquor an undesirable taste. It is well recognized that the removal of such congeners lessens the possibility of hangover or nausea resulting from over consumption. The apparatus and method of the present disclosure is adapted to treat various kinds of distilled and/or fermented liquors, such as vodka. When the apparatus treats alcohol, such as ethanol which will be used as an oxygenate biofuel, the apparatus converts the contaminants (e.g., ketones, aldehydes, esters and hydrocarbons) that if left in the ethanol will, during the combustion process of the fuel, likely be released into the atmosphere or converted in the engine and catalytic converter to pollutants.

A reaction vessel 10 holds the liquid 12, such as alcohol, to be treated. The vessel 10 is sealed, such that any alcohol or vapor seeking to escape the vessel is controlled. The liquid 12 to be processed is placed in the vessel 10. In the preferred embodiment the space occupied by the liquid, referred to the liquid space 14, is carefully controlled. The liquid space 14 occupies approximately fifty (50%) to seventy-five (75%) percent of the volume of the vessel 10. The remaining space is referred to as the vapor space or head space 16. In the preferred embodiment of the present disclosure, the vapor space 16 occupies the other twenty-five (25%) to fifty (50%) percent of the volume of the pressure-controlled vessel 10. On average, the liquid occupies approximately sixty-five (65%) of the volume of the vessel 10 and the vapor space 12 occupies approximately thirty-five (35%) of the volume of the vessel 10. The apparatus is equipped with a liquid and/or headspace thermometer 18 and a thermostating heat source 20 to control the temperature of the liquid.

Attached to the vessel 10 is a means for pulling a vacuum within the vessel 10. In the preferred embodiment, the means for pulling the vacuum comprises a vacuum pump 22 that is in fluid communication with an interior of the vessel 10, through a tube 24 connected to the portion of the vessel 10 containing the vapor space or head space 16. A pressure monitor/vacuum gauge 26 is interconnected to the vessel 10 to measure the pressure inside the vessel 10. In the preferred embodiment, tubing 24 connects the vessel to the pump 22 and pressure monitor/vacuum gauge 26 and the gas supply, and the pressure is maintained at between −29 and +30 mm Hg, depending on the processing phase.

Means are also included to measure the flow rate of the gas being drawn through the fluid. In the preferred embodiment, a float-ball type flow rate meter 28 is used. The preferred flow rate varies with the phase of treatment and is fixed at between 4 and 10 liters per minute, depending on the phase.

Means are provided for placing a gas in contact with the liquid 12. In the preferred embodiment, the means for placing gas in contact with the liquid 12 includes tubes connected to the Gas1 source in a way that allows the gas to enter the vessel. The temperature and pressure conditions under which the apparatus is operated prevents the liquid, in this case alcohol in the alcohol/water mixture, from escaping the vessel (the conditions do not permit vacuum or sub-boiling distillation).

In the preferred embodiment, means are provided for dispersing the gas into the liquid 12, namely alcohol, in a manner that creates different sizes of bubbles in the liquid 12. In the preferred embodiment, these means comprise glass frits attached to the tubes 24 at or near where the tubes 24 connect to the vessel 10, whereby the gas flows into the liquid 12 through different size pore openings, such as fine, medium and coarse. These tubes have individual flow control stopcocks to control the proportion of bubbles of a specific size (so individual flow rates can further be monitored and controlled). Gas can also enter the reaction vessel 10 through an unmodified tube opening, creating large bubbles. The vacuum drawn in the vessel 10, which primarily affects the vapor in the head space 16, causes the gas placed in contact with the liquid 12 through the tubes 24 to be pulled through the liquid 12 into the head space 16.

In the preferred embodiment, energy consumption for each device (vacuum pump 34, stir paddle 36, an acoustic energy source 38 (such as a TEKMAR™ model V1A sonic horn and managed power supply), heat source 40 and vapor capture system 42 are monitored using commercially available watt-hour meters.

A previously used device according to U.S. Pat. No. 5,778,763 (Ford et al.) includes an apparatus that pulls a vacuum of about 95% of atmospheric pressure (about −722 mm of mercury). The turbulence created by this high vacuum not only creates large bubbles which collapse and cause volatiles and semi-volatiles contained in the alcohol to be exhausted into the atmosphere, but it also results in a loss of substantial quantities of the alcohol. In the preferred embodiment of the present disclosure, the vacuum is controlled with the use of a needle valve and certified electronic pressure monitor/vacuum gauge. This reduced vacuum pressure results in the loss of less of the alcohol being treated as compared to a situation where the volatile and semi-volatile are exhausted to the atmosphere. Further, the method of the present disclosure is believed to likely additionally depend on energetic reactions and disruption/inversion of solvent-solvate hydrogen bonding.

Also interconnected with the inside of the vessel 10 is a means for measuring the temperature of the liquid 12 in the vessel 10 and/or headspace 16. This measuring means may be a temperature sensor or gauge 44 such as a thermometer, a thermocouple, a temperature probe, a potentiometer, or any other such apparatus that is well known to those skilled in the art. In the preferred embodiment the means for measuring the temperature of the liquid is a certified thermometer or thermocouple. In the preferred embodiment, the temperature of the alcohol is controlled such that it does not vary from the setpoint of 35 degrees C. by more than 3 degrees C.

In the preferred embodiment, there is provided a means for agitating the alcohol while contained in the vessel 10 and while the air is being pulled through the alcohol as a result of the vacuum drawn in the vessel. In the preferred embodiment, the means for agitating the alcohol comprises a propeller or stir paddle mounted in the bottom of the vessel 10. This propeller or paddle 36 rotates in response to a magnetic field. In the preferred embodiment, a magnetically-driven propeller of a material with controlled wetting characteristics (hydrophobicity/hydrophilicity) is used. The solvent polarity in the system can be adjusted dynamically, even during treatment time, to tune for the HLB (Hydrophilic-Lypophilic Balance) and $K_{ow}$ (Octanol-Water Partition Coefficient) and surface tension of a particular contaminant to selectively treat it.

As used herein, the terms "cavitate" or "cavitation" refer to the formation and implosion or collapse of bubbles (cavities) in the alcohol. There can occur inertial cavitation, in which a bubble or cavity collapses and produces a shock wave, and non-inertial cavitation, in which a bubble or cavity oscillates in size due to energy input, such as an acoustic energetic field.

It is believed that the combined operation of the components of the hybrid apparatus described herein creates cavities in the alcohol being treated. These cavities absorb or permit vapor phase reactions with volatile and semi-volatile contaminants, such as congeners. Cavities then collapse or implode promoting homolytic cleavage and/or single electron oxidation ultimately resulting in the production of free radicals. Free radicals then react with contaminants, including congeners, and convert them to a less objectionable compounds, as evidenced by reductions in off-taste and off-odor upon treatment of alcohol according to the method of the present disclosure.

Interconnected to the vessel is a means for generating sonoacoustic energetic waves in the liquid in the vessel. In the preferred embodiment, a suitable means for generating the waves is a TEKMAR™ model V1A sonic horn and managed power supply. In the preferred embodiment, the acoustic wave source 38 is mounted vertically, enters the reaction space through the top of the reaction vessel 10, and its tip 48 is inserted at a fixed depth below the gas-liquid interface.

While the frequency and the amplitude of the acoustic energy waves may vary from 1 Hz to 10 mHz, in the preferred embodiment the frequency of the acoustic waves is critical and fixed. The output control is carefully adjusted to optimize energy inputs and reaction chemistry and to minimize ethanol losses.

The acoustic energy may be imparted to the alcohol either in bursts or continuously. In the preferred embodiment, the acoustic waves are continuously applied.

In the preferred embodiment of the method and apparatus of the present disclosure, contaminants, such as congeners, are not out-gassed to the atmosphere. Instead, contaminants are converted in situ to a less objectionable form, the latter of which remain in the solution. Thus, environmental issues regarding hazardous exhaust are mitigated. Of course, contaminants, such as congeners, could still be exhausted into the atmosphere or somehow captured by some adsorption means, but the present disclosure provides an apparatus and method rendering this unnecessary for all but a few compounds. The system permits reduced temperature trapping of economically valuable off-gas products, such as beneficial flavor esters or contaminants such as acetaldehyde. This capability makes it possible to trap all emissions from the system to eliminate airborne environmental pollution, a major technical difficulty of corn or grain and cellulosic ethanol and beverage production. One possible use of the trapped products is in the production of adulterants for non-taxable, non-beverage products, such as fuel oxygenates, a major cost of the bioethanol industry. The present apparatus is equipped with a vapor capture system with a renewable adsorbent cartridge to accept vacuum pump off-gas preceded by a −78 degree dry ice/methyl ethyl ketone bubbler/cold trap.

In a further embodiment of the present disclosure, there is a means for injecting a reactive gas with solute properties into the liquid 12 in the vessel 10. In the further embodiment, the means for injecting this gas comprises a cylinder, a regulator, and a pressure gauge. Exhaustive analytical testing of treated and untreated samples, including testing of off-gas reaction products captured at −78 C in a cold trap, has determined that the reactive gas reacts with certain congener contaminants under the energetic conditions of the process to render them less challenging to human metabolism. In the method of the present disclosure, the treatment gas can be used in either a combined or separate treatment stage from the acoustic energy phase For the examples below, inspection and analysis of a trap containing pure ethanol at the system outlet at −78 C, analyzed at room temperature, shows a wide range of compounds that were directly removed, new reaction products partly or completely removed and an insoluble colloidal suspension consisting of extracted ethanol insoluble oils or reaction products.

In addition to the examples shown below, the system has been successfully evaluated for the treatment of several wines and dark spirits including whiskey, wines, rum, brandy, gin, beer, agave sweeteners and flavors. There may also be potential for medical applications in hyperbaric drug-delivery systems based on the unique bubble dynamics of the method and apparatus of the present disclosure.

EXAMPLE 1

TAAKA™, an inexpensive, commercial retail vodka produced by Sazerec Company with a broad class of congeners, understood from the Sazerec Company's Internet website to be four-times distilled, generally regarded to be of "bottom-shelf" quality, was treated using the apparatus and method of the present disclosure.

TAAKA™ vodka (which typically receives less favorable placement on retail shelf and has a relatively low retail cost when compared to so-called "top-shelf" vodkas) was effectively treated in 20 minutes using the process described herein in two stages.

Initially, 25 mL of an untreated 1.75 L bottle of TAAKA™ vodka was set aside for comparative purposes. This sample was subjected to SPME (Solid Phase Micro-Extraction) GC-MS (gas chromatography/mass spectrometry) analysis in order to characterize the presence and abundance of certain contaminants, such as congeners. The data obtained was interpreted in quantifiable terms and is presented in Table 1 under the label "A: TAAKA™ Untreated".

The TAAKA™ vodka was treated for 10 minutes in Stage 1, described as follows:

Into the specially designed apparatus described and illustrated in FIG. 1, 750 ml of TAAKA™ vodka was added. A head space of approximately 250 ml remained above the surface of the liquid phase. A vacuum was pulled in the manner described in the preferred embodiment of the present disclosure at a constant, measured rate of flow. The vacuum pressure was controlled in the manner described in the preferred embodiment. Energy was applied in the manner described in the preferred embodiment to effect separation and to induce reactions. The temperature of the liquid phase was maintained within 3 degrees of the setpoint.

A 25 mL sample was removed from the reaction vessel after Stage 1. In practice, the diluent water used to dilute beverages before sale can contribute additional volatile and semi-volatile contaminants. This sample was subjected to gas chromatography/mass spectrometry (GC-MS) analysis in order to characterize the presence of and abundance of certain contaminants, such as congeners and other impurities including those from the diluent water, from treatment gases and from activated carbon cleanup of the vodka. The data obtained was interpreted in quantifiable terms as absolute peak areas, defined to be directly proportional to concentration, and is presented in Table 1 under the label "B: TAAKA™ Gas1 +ET".

In Stage 2, the solution from Stage 1 was treated with gas in combination with acoustic energy both in the manner described in the preferred embodiment for 5 minutes. The hose that in Stage 1 allowed the intake of atmospheric air was connected to the gas regulator output. All other parameters unchanged, the gas regulator was adjusted for fixed output pressure.

A 25 mL sample was removed from the reaction vessel after Stage 2. This sample was subjected to gas chromatography/mass spectrometry (GC-MS) analysis in order to characterize the presence and abundance of certain contaminants, such as congeners. The data obtained was interpreted in quantifiable terms and is presented in Table 1 under the label "C: TAAKA™ Gas1 +ET".

Using the integrated peak areas and library identifications of unknown compounds in the vodka (retention times, labeled "R.T.", are presented in column 2), amounts were compared before treatment, after Stage 1, and after Stage 2 (column 1). Peak areas were normalized (column 4) to the post-treatment internal standard (ethyl acetate; I.S.). Cumulative reductions in congener/contaminant levels were calculated for each identified compound (column 5).

Vodka treatment represents an order of magnitude increase in treatment challenges over successful taste-panel results in an early phase study. The taste and odor issues of the untreated lower end vodka likely arise from congeners contaminants which are fermentation and activated carbon treatment by-products, either acting singly or synergistically. The idealized "Top-Shelf" vodka contains a minimum of contaminants taste and odor compounds which might contribute to hangovers, and has no objectionable taste and sells for a premium price. Compounds, in order of their instrument response normalized to an internal standard, and their treatment losses at each stage, are shown below. Sixty two likely congeners were measured, the majority of which showed removal to levels below the limit of detection by solid phase microextraction (SPME) GC-MS. Six tasters assessed the vodka quality to be much-improved in blind organoleptic testing. This includes improved flavor and aroma and reduced after-taste for a quality on par with better "top-shelf" vodkas. One compound showed apparent increases which were not significant within experimental error. In addition, one unidentifiable reaction product was found at low levels.

TABLE 1

Comparison of Untreated Bottom-shelf Vodka Sample with Samples Acquired after Stage 1 and Stage 2 of Treatment.

| Treatment | R.T. | Compound | Normalized Area | % Change |
|---|---|---|---|---|
| A: | 4.80 | 1-Hydroxy-2-butanone | 5.57E05 | |
| B: | ND | | 0 | −100% |
| C: | ND | | 0 | −100% |
| A: | 4.99 | Ethyl Chloride | 7.33E05 | |
| B: | ND | | 0 | −100% |
| C: | ND | | 0 | −100% |
| A: | ND | | 0 | |
| B: | 6.75 | Acetone | 6.24E05 | N/A |
| C: | ND | | 0 | −100% |
| A: | ND | | 0 | |
| B: | 7.21 | Formic acid, ethyl ester | 2.57E05 | NEW |
| C: | 7.20 | 1,3-Propanediol | 4.08E05 | 59% |
| A: | 10.67 | Ethyl Acetate | 4.21E06 | I.S. |
| B: | 10.58 | | 4.21E06 | I.S. |
| C: | 10.59 | | 4.21E06 | I.S. |
| A: | ND | | 0 | |
| B: | 11.33 | Furan, tetrahydro- | 5.17E05 | NEW |
| C: | 11.32 | | 6.37E05 | 23% |
| A: | 12.22 | 2(3H)-Furanone, dihydro-3-methyl- | 2.68E05 | |
| B: | ND | | 0 | −100% |
| C: | ND | | 0 | −100% |
| A: | 12.47 | Benzene | 3.52E05 | |
| B: | ND | | 0 | −100% |
| C: | ND | | 0 | −100% |
| A: | ND | | 0 | |
| B: | 13.92 | Ethane, 1,1-diethoxy- (Acetal) | 1.04E06 | NEW |
| C: | 13.91 | | 9.01E05 | −13% |
| A: | 16.71 | Hexanal | 3.75E05 | |
| B: | ND | | 0 | −100% |
| C: | ND | | 0 | −100% |
| A: | 16.75 | 2,4-Dimethyl-1-heptene | 3.98E05 | |
| B: | ND | | 0 | −100% |
| C: | ND | | 0 | −100% |
| A: | 17.31 | 2-Ethoxytetrahydrofuran | 1.47E05 | |
| B: | ND | | 0 | −100% |
| C: | ND | | 0 | −100% |
| A: | 18.10 | D-Erythro-Pentose, 2-deoxy- | 1.65E05 | |
| B: | ND | | 0 | −100% |
| C: | ND | | 0 | −100% |
| A: | 18.96 | Pyrido[2,3-d]pyrimidine | 1.26E05 | |
| B: | ND | | 0 | −100% |
| C: | ND | | 0 | −100% |
| A: | 19.91 | Octane, 2,6-dimethyl- | 1.87E05 | |
| B: | ND | | 0 | −100% |
| C: | ND | | 0 | −100% |
| A: | 20.58 | Decane | 1.19E06 | |
| B: | ND | | 0 | −100% |
| C: | ND | | 0 | −100% |
| A: | 20.76 | 1-Butanol, 2,2-dimethyl- | 2.40E05 | |
| B: | ND | | 0 | −100% |
| C: | ND | | 0 | −100% |
| A: | 20.86 | Tetradecane, 4-methyl- | 2.97E05 | |
| B: | ND | | 0 | −100% |
| C: | ND | | 0 | −100% |
| A: | 21.01 | Butanoic acid, 3-oxo-, ethyl ester | 1.11E06 | |
| B: | ND | | 0 | −100% |
| C: | ND | | 0 | −100% |
| A: | 21.29 | Butane, 2,2,3-trimethyl- | 3.26E05 | |
| B: | ND | | 0 | −100% |
| C: | ND | | 0 | |
| A: | 21.55 | 1,3-Propanediol, 2-ethyl-2-(hydroxymethyl)- | 3.48E05 | |
| B: | ND | | 0 | −100% |
| C: | ND | | 0 | −100% |
| A: | 21.71 | Phenol | 2.37E05 | |
| B: | ND | | 0 | −100% |
| C: | ND | | 0 | −100% |

TABLE 1-continued

Comparison of Untreated Bottom-shelf Vodka Sample with Samples Acquired after Stage 1 and Stage 2 of Treatment.

| Treatment | R.T. | Compound | Normalized Area | % Change |
|---|---|---|---|---|
| A: | 21.78 | Octanal | 9.84E05 | |
| B: | ND | | 0 | −100% |
| C: | ND | | 0 | −100% |
| A: | 21.83 | 2,5-Furandione, dihydro-3-methylene | 1.08E06 | |
| B: | ND | | 0 | −100% |
| C: | ND | | 0 | −100% |
| A: | 21.90 | Furan | 4.27E05 | |
| B: | ND | | 0 | −100% |
| C: | ND | | 0 | −100% |
| A: | 22.12 | 2-Ethylacridine | 4.08E05 | |
| B: | ND | | 0 | −100% |
| C: | ND | | 0 | −100% |
| A: | 22.20 | Benzo[h]quinoline, 2,4-dimethyl- | 2.38E06 | |
| B: | ND | | 0 | −100% |
| C: | ND | | 0 | −100% |
| A: | 22.53 | Cyclopentane, propyl- | 3.73E05 | |
| B: | ND | | 0 | −100% |
| C: | ND | | 0 | −100% |
| A: | ND | | 0 | |
| B: | ND | | 0 | N/A |
| C: | 22.38 | Auramine o | 1.09E06 | NEW |
| A: | 22.82 | Undecane | 4.37E06 | |
| B: | 22.82 | | 1.64E06 | −62% |
| C: | 22.82 | | 9.19E05 | −79% |
| A: | 23.09 | 2-Methyl-1-undecanol | 5.23E05 | |
| B: | ND | | 0 | −100% |
| C: | ND | | 0 | −100% |
| A: | 23.20 | 1-Eicosanol | 4.89E05 | |
| B: | ND | | 0 | −100% |
| C: | ND | | 0 | −100% |
| A: | 23.56 | Oxalic acid, cyclobutyl nonyl ester | 3.97E05 | |
| B: | ND | | 0 | −100% |
| C: | ND | | 0 | −100% |
| A: | 23.69 | Hexanoic acid, 2-ethyl-, decyl ester | 3.19E05 | |
| B: | ND | | 0 | −100% |
| C: | ND | | 0 | −100% |
| A: | 23.99 | Nonanal | 2.73E06 | |
| B: | 23.99 | Nonanal | 3.77E05 | −86% |
| C: | 23.99 | 2-Nonen-1-ol, (E)- | 2.23E05 | −92% |
| A: | 24.05 | 2,3-Dimethyldecane | 2.99E05 | |
| B: | ND | | 0 | −100% |
| C: | ND | | 0 | −100% |
| A: | 24.11 | Undecane, 2-methyl- | 4.99E05 | |
| B: | 24.12 | Decane | 1.77E05 | −65% |
| C: | 24.12 | 2,6-Dimethyldecane | 1.14E05 | −77% |
| A: | ND | | 0 | |
| B: | 24.31 | Decane, 3-methyl- | 1.58E05 | NEW |
| C: | ND | | 0 | −100% |
| A: | 24.88 | Dodecane | 2.89E06 | |
| B: | 24.88 | | 1.32E06 | −54% |
| C: | 24.89 | | 7.06E05 | −76% |
| A: | 25.08 | Undecane, 2,6-dimethyl- | 3.13E05 | |
| B: | ND | | 0 | −100% |
| C: | ND | | 0 | −100% |
| A: | 25.27 | Hexadecane, 1,1-bis(dodecyloxy)- | 2.48E05 | |
| B: | ND | | 0 | −100% |
| C: | ND | | 0 | −100% |
| A: | 25.71 | Benzenecarboxylic acid | 2.59E05 | |
| B: | ND | | 0 | −100% |
| C: | ND | | 0 | −100% |
| A: | 26.02 | Decanal | 4.60E06 | |
| B: | ND | | 0 | −100% |
| C: | ND | | 0 | −100% |
| A: | 26.81 | Methoxyacetic acid, 2-tetradecyl ester | 1.00E06 | |
| B: | 26.80 | Dotriacontane | 3.04E05 | NEW |
| C: | ND | | 0 | −100% |
| A: | 27.01 | Benzoic acid, 2-hydroxy-, methyl ester | 7.03E05 | |
| B: | ND | | 0 | −100% |
| C: | ND | | 0 | −100% |

TABLE 1-continued

Comparison of Untreated Bottom-shelf Vodka Sample with Samples Acquired after Stage 1 and Stage 2 of Treatment.

| Treatment | R.T. | Compound | Normalized Area | % Change |
|---|---|---|---|---|
| A: | 27.17 | E-8-Methyl-9-tetradecen-1-ol acetate | 7.49E05 | |
| B: | | ND | 0 | −100% |
| C: | | ND | 0 | −100% |
| A: | 27.41 | 1,3-Dioxane,5-(hexadecyloxy)-2-pentyl- | 3.20E05 | |
| B: | | ND | 0 | −100% |
| C: | | ND | 0 | −100% |
| A: | 27.50 | Sarcocapnidine | 1.87E05 | |
| B: | | ND | 0 | −100% |
| C: | | ND | 0 | −100% |
| A: | 27.75 | 1,3-Dioxane,5-(hexadecylooxy)-2-pentyl- | 1.30E05 | −100% |
| B: | | ND | 0 | −100% |
| C: | | ND | 0 | |
| A: | 28.09 | Octadecanoic acid, 2-oxo-, methyl | 2.06E05 | |
| B: | | ND | 0 | −100% |
| C: | | ND | 0 | −100% |
| A: | 28.59 | Eicosane | 6.58E05 | |
| B: | 28.59 | Methoxyacetic acid, 2-tetradecyl ester | 2.63E05 | −60% |
| C: | 28.59 | Nonadecane | 2.31E05 | −65% |
| A: | | ND | 0 | |
| B: | 29.05 | Caprolactam | 4.01E05 | NEW |
| C: | | ND | 0 | −100% |
| A: | 29.15 | E-8-Methyl-9-tetradecen-1-ol acetate | 9.07E04 | |
| B: | | ND | 0 | −100% |
| C: | | ND | 0 | −100% |
| A: | 29.31 | Naphthalene, 1-methyl- | 3.31E05 | |
| B: | | ND | 0 | −100% |
| C: | | ND | 0 | −100% |
| A: | 29.41 | 4,4-Dimethyl-1-hexene | 4.23E05 | |
| B: | | ND | 0 | −100% |
| C: | | ND | 0 | −100% |
| A: | 29.62 | Propanoic acid, 2-methyl-, 2-ethyl- | 6.84E05 | |
| B: | | ND | 0 | −100% |
| C: | | ND | 0 | −100% |
| A: | 29.69 | Phthalic acid, undec-2-en-1-yl | 3.17E05 | |
| B: | | ND | 0 | −100% |
| C: | | ND | 0 | −100% |
| A: | 29.81 | 9-Oxabicyclo[4.2.1]nonan-2-ol | 9.92E04 | |
| B: | | ND | 0 | −100% |
| C: | | ND | 0 | −100% |
| A: | 30.12 | Dodecahydropyrido[1,2-b]isoquinoline | 6.22E05 | |
| B: | | ND | 0 | −100% |
| C: | | ND | 0 | −100% |
| A: | 30.27 | Eicosane | 8.38E05 | |
| B: | 30.27 | Heptacosane | 1.98E05 | −76% |
| C: | | ND | 0 | −100% |
| A: | | ND | 0 | |
| B: | 31.19 | 2,4-Bis(hydroxylamino)-6-methylpyropyl- | 1.42E05 | −100% |
| C: | | ND | 0 | −100% |
| A: | | ND | 0 | |
| B: | 31.25 | Piperidine N-ethyl-4-[1-aminoethyl | 1.50E05 | NEW |
| C: | 31.26 | (Z)-Cinnamic acid | 1.15E05 | −23% |
| A: | 31.85 | Eicosane | 4.79E05 | |
| B: | 31.85 | 2-Ethylacridine | 3.93E05 | −18% |
| C: | | ND | 0 | −100% |
| A: | 32.40 | Octadecane, 1-[2-(hexadecyloxy)ether] | 1.02E05 | |
| B: | | ND | 0 | −100% |
| C: | | ND | 0 | −100% |
| A: | 32.50 | 2-Butenoic acid, 2-methyl-, (E)- | 1.28E06 | |
| B: | | ND | 0 | −100% |
| C: | 33.54 | 2-Ethylacridine | 1.32E05 | −100% |
| A: | 34.06 | Octadecanoic acid, 2-oxo-, methyl ester | 6.96E05 | |
| B: | | ND | 0 | −100% |
| C: | | ND | 0 | −100% |

ET indicates Energetic Treatment.
A: TAAKA ™ Vodka, Untreated
B: TAAKA ™ Vodka, Gas1 + ET
C: TAAKA ™ Vodka, Gas2 + ET The results provided show a marked decrease in contaminant concentration. Many particularly undesirable species such as acetaldehyde are removed with 100% efficiency. Additionally, the use of Gas2 in Stage 2 is shown to increase the effectiveness of converting particular undesirables such as acetaldehyde, noxious and toxic acetal, acetone, undecane, dodecane, decane, nonanal, dotriacontane, caprolactam, 2-ethylacridine, and others. These results indicate a significant and quantifiable decrease in objectionable taste and odor and predicted metabolic impacts of the sample treated by the invention disclosed herein.

Figure 2:
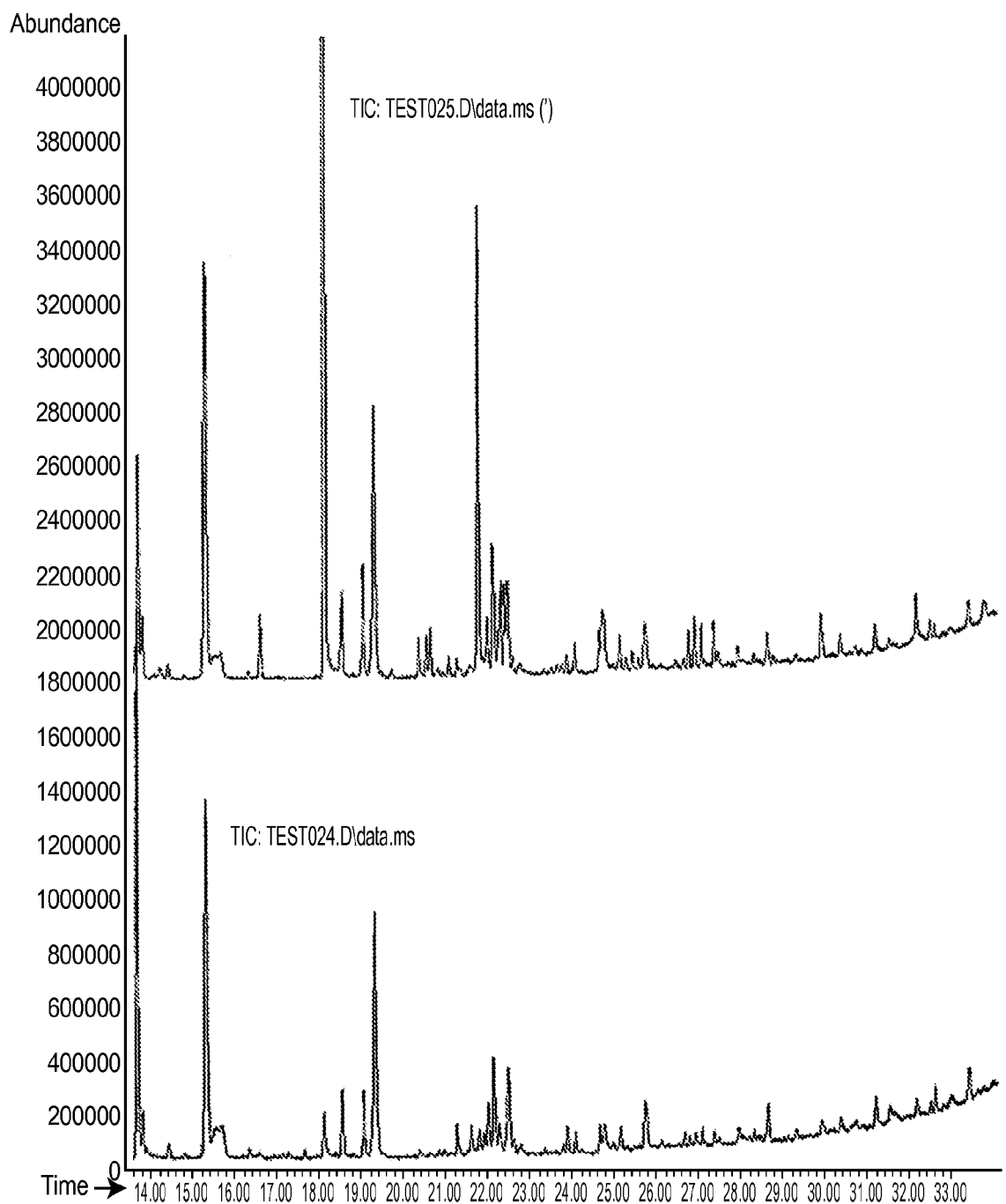
FIG. 2 is a gas chromatography/mass spectrometry chromatogram of a low-purity or "bottom-shelf" vodka (a beverage of low quality which does not command a premium price or warrant a preferred location on the liquor store shelf) before and after treatment utilizing an apparatus illustrated in FIG. 1.

An example of the data obtained from GC-MS analysis is set out in FIG. 2. This particular example corresponds to headspace analysis for the treatment of a sample of TAAKA™ Vodka. The blue line (top) in the image corresponds to an untreated sample of the vodka. The black line (bottom) in the image corresponds to a sample of TAAKA™ Vodka treated in the manner prescribed in the preferred embodiment. As is evident from inspection of the two chromatograms, there is a dramatic reduction in area for many of the contaminant peaks, reflecting a reduction in concentration. The difference in peak areas between the two curves is used to calculate decrease in the amount of contaminants present in the sample.

EXAMPLE 2

A grain-derived ethanol manufactured at the Bushmills Ethanol Distillery, Atwater, Mn and intended for use as a fuel oxygenate, as received from the plant at the final distillation stage for the production at 190 proof prior to drying was treated using the process of the preferred embodiment. Three phases of treatment were employed, an oxidative phase B, an energetic phase C and a reactive/extractive phase D. Samples were taken from the apparatus after the completion of each phase and were analyzed by SPME GC-MS. One hundred and nine compounds were identified by SPME GC-MS, showing a very high level of contamination for this industrial alcohol. Compounds appearing unexpectedly at high concentrations were confirmed to include contaminants of laboratory air used in the process, readily removed in a production implementation. Exemplary congeners identified in 190 proof corn ethanol are disclosed in Table 2.

TABLE 2

1-butanol
1-butanol, 3-methyl, acetate
1,1-diethoxy hexane
1,3-butanediol
2-hexynoic acid
Acetaldehyde
2-methyl-1-butanol
3-methyl-1-butanol TABLE 2-continued amyl alcohols or fusel oils
3,3-diethoxy-1-propanol
3,4-furandiol, tetrahydro, trans- and -cis Drip gas, used to adulterate 200 proof ethanol to make it non-potable and non-taxable, is a major cost for corn or grain ethanol producers. Unidentified reaction products, such as those of acetaldehyde, may be captured in emissions of the preferred embodiment and may have commercial value as fuel adulterants. Certain unknown compounds could not be reliably identified with mass spectral libraries. Some of the compound library matches for particular observed peaks are clearly improbable for the given matrix. Table 3 shows counts of the number of compounds at various levels of removal and/or conversion in the 3 phases, as well as the compounds which were released from the distilled ethanol matrix itself. The example demonstrates the importance of the multiple methods of treatment in the preferred embodiment. Furthermore, the example demonstrates that each phase can release additional compounds from the azeotropic (constant boiling) matrix through de-emulsification with the likely mechanisms described herein. These compounds were not removed by distillation but may be able to be distilled out after treatment with the preferred embodiment.

Recent tests and observations confirm removals as high as 95% using additional optimization to the process based on the method and apparatus of the present disclosure.

TABLE 3

Count of Compounds Removed/Converted in Fuel Oxygenate Ethanol in Sequential Treatment Phases

| % Reduction | Phase B - # Reduced | Phase C - # Reduced | Phase D - # Reduced |
| --- | --- | --- | --- |
| 0-9 | 12 | 3 | 3 |
| 10-19 | 8 | 8 | 8 |
| 20-29 | 7 | 8 | 8 |
| 30-39 | 4 | 7 | 7 |
| 40-49 | 3 | 3 | 3 |
| 50-59 | 2 | 1 | 3 |
| 60-69 | 2 | 2 | 1 |
| 70-79 | 1 | 2 | 1 |
| 80-89 | 0 | 1 | 1 |
| 90-99 | 1 | 1 | 1 |
| 100 compounds | 15 | 5 | 0 |
| decreased | 55 | 41 | 36 |
| Compounds released from matrix | 45 | 48 | 46 |

EXAMPLE 3

JOSE CUERVO GOLD™, a popular but low- to middle-grade tequila, was treated with the process of the preferred embodiment of the present disclosure. This beverage is unlike more expensive tequilas which are more completely aged, distilled and filtered, and which are understood to contain less metabolically impactful, "hangover" producing congeners. Tequilas like JOSE CUERVO GOLD™ can be highly chemically variable depending on the source of fermented agave. Certain compounds which appear to increase were verified to be contaminants of laboratory air used in the process and were excluded from consideration, which contaminants would be readily removed in a production application. Compounds below the limit of detection are shown as zero peak area. A substantial reduction in many congeners results in the treatment process. The flavor of these amber Reposado ("rested" or wood aged) tequilas was also found in taste tests to benefit from application of this process of the preferred embodiment. The process of the present disclosure permits tequila distillers to avoid costly and harsh distillation steps, which connoisseurs believe degrade fine tequila, while gently maintaining the character of the beverage.

The process of the present disclosure has also been demonstrated in testing to have value at an intermediate distillation stage as well as in the polishing the final product, the "Ordinario". Ordinario results directly from distillation of the fermented low-alcohol wort. In the traditional tequila process, Ordinario is distilled to "Silver Tequila" before marketing, which is itself sometimes re-distilled for further refinement. In the preferred embodiment, treatment of the Ordinario to break oil-in water micro-droplet suspensions, colloids or emulsions, probably due to ethanol-water phase inversions caused by the process, results in solubilization of congeners otherwise inaccessible to distillation at this stage and difficult to distill out. In the preferred embodiment, a clearing of the colloidal opacity results with concurrent undesirable congener removal. After treatment with the process of the present disclosure, distillation of the Ordinario to produce "Silver Tequilla" is expected to result in a more refined product with fewer undesirable impurities which still retains its unique Tequilla character.

Despite its greater chemical complexity, the JOSE CUERVO GOLD™ tequila results were similar to those of the TAAKA™ vodka, which substantial decreases in congener concentrations. Subsequent to treatment in accordance with the preferred embodiment of the present disclosure, the product was judged by multiple tasters to be less harsh and of better character, flavor and aroma than untreated tequila.

EXAMPLE 4

A near-beverage grade, commercially available, taxable REMET™ (La Mirada, Calif.) 190 Proof Grain Neutral Spirit ethanol sample, was treated in accordance with the process of the present disclosure both "neat" (unaltered), and with a four-phase protocol employing dynamic wetting and solvent polarity control of the solution. This example illustrates the value of the process of the present disclosure in bypassing distillation steps for a Grain Neutral Spirit intended for beverage or pharmaceutical use. Compounds were measured in the sample, and certain compounds which appear to increase are likely increased in headspace vapor concentration in a particular phase by breaking of the azeotrope, de-emulsification and wetting in the solution itself.

Figure 3:
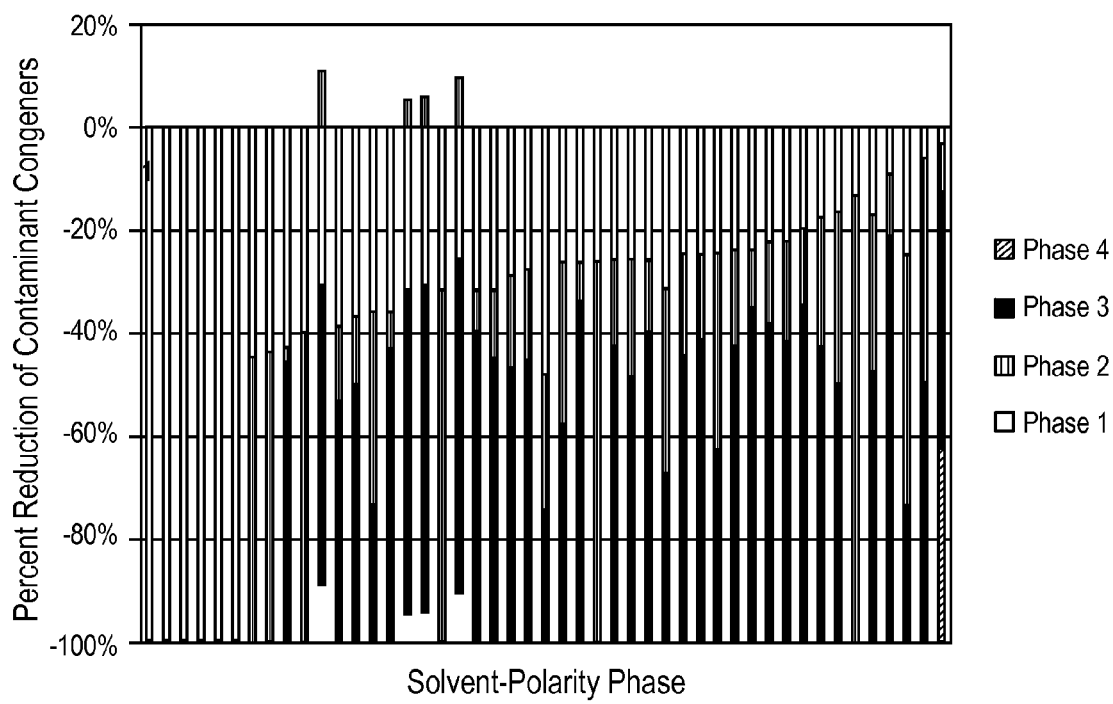
FIG. 3 is a plot illustrating the cumulative percent reduction of contaminant congeners as a function of solvent-polarity phase, in order of phase 1 completeness.

The chemical properties (boiling point, Kow, HLB, Debye constant, solubility, Henry's Law Constant, vapor pressure, surface tension, molecular weight, zeta potential, contact angle and reactivity) of a particular co-distillate congener determine the success of its treatment in the preferred embodiment. FIGS. 2 and 3 illustrate the solvent polarity control approach of the preferred embodiment of the present disclosure which takes advantage of these thermodynamic properties under the influence of micelle formation and clathrate structure changes.

Forty-seven compounds with highly variable chemistries which were consistent with expected co-distillation contaminants were found to decrease with the effect of dynamic wetting and solvent polarity control of the system of the preferred embodiment of the present disclosure, as employed in this Example. FIG. 3 illustrates the treatment effect for the 47 compounds fully treated (i.e. removed or converted to reaction products), in order of Phase 1 completeness, for each phase of decreasing solvent polarity. An average removal rate of 27% in Phase 1, 23% in Phase 2 and 55% in Phase 3 identifies the optimum solvent polarity/wetting regime for this material being as Phase 3. While the phase changes were made step-wise in the preferred embodiment, the apparatus and process of the present disclosure can be readily adapted for continuous variation of solvent polarity and molecular surface wetting characteristics. FIG. 3, illustrating the cumulative treatment effect by phase, demonstrates that tuning the solvent polarity and wetting characteristics of the system is an effective means of removing a broad class of congener contaminants from high-proof Grain Neutral Spirits. The recognition of patterns in behavior of compounds in accordance with the process of the preferred embodiment of the present disclosure allows for cognitive control of the system. Not shown here are data showing the significant and valuable treatment effect for GNS treated in the preferred embodiment without solvent polarity/wetting variation, directly as received from the distiller. In application, the solvent polarity modifier/wetting agent can be recovered and re-used.

The example shows that certain contaminants are effectively removed in a single step when the process is run on 190 proof fuel-grade ethanol prior to drying. Major producers like Archer-Daniels distill out compounds in this class to produce a product acceptable to vodka manufacturers. However, product losses, on a volume basis, can be 84 to 88% as 12% grain mash is distilled to 120 Proof intermediate product. Further ethanol losses can be 89 to 92% as 120 proof Ethanol is distilled to the 190 proof azeotrope, then dried. The 190 proof product for gasoline blending is still badly contaminated and is not particularly pure. Conventionally, many additional distillation steps are needed to rectify this material for suitability for beverage use. When this product is dried using molecular sieve and membrane technology, its high levels of congener foul and inactivate the expensive molecular sieve beds and damage polymeric membranes, shortening the maintenance cycle and increasing costs. There are opportunities for reducing the operations costs of the sieve beds by using the process of the present embodiment to produce a cleaner product.

Figure 4:
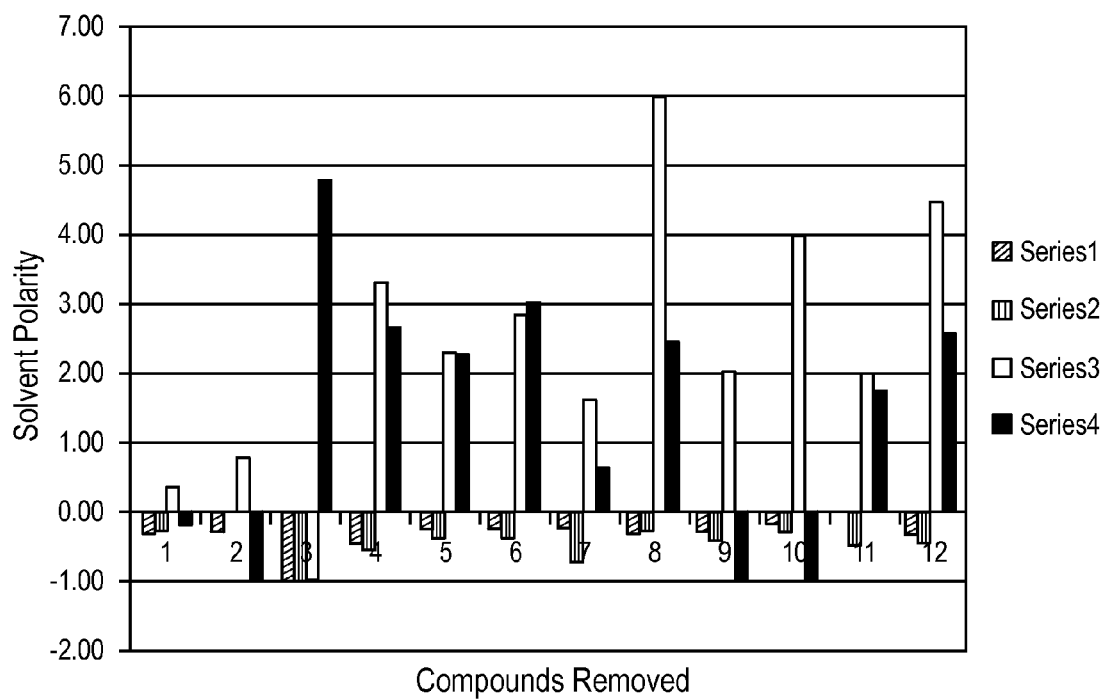
FIG. 4 is a plot of compounds showing phase 1 and 2 removal released by de-emulsification and surface wetting in phase 2 and 3 with decreasing solvent-polarity.

Another class of twelve compounds shown in FIG. 4 is partially treated in Phases 1 and 2, then released from solution, likely due to de-emulsification and wetting, in Phases 3 and 4. These compounds are principally esters and organic salts, including zwitterions which are capable of residing on micro- and nano-droplet surface and solute interfaces. This figure illustrates that the treatment effect is a combination of physiochemical processes and energetic reactive chemistry. Even certain compounds which are apparently present at trace levels in the aqueous solvent polarity modifier are effectively removed. In application, the aqueous solvent polarity modifier can be readily cleaned of these contaminants at minimal cost.

Figure 5:
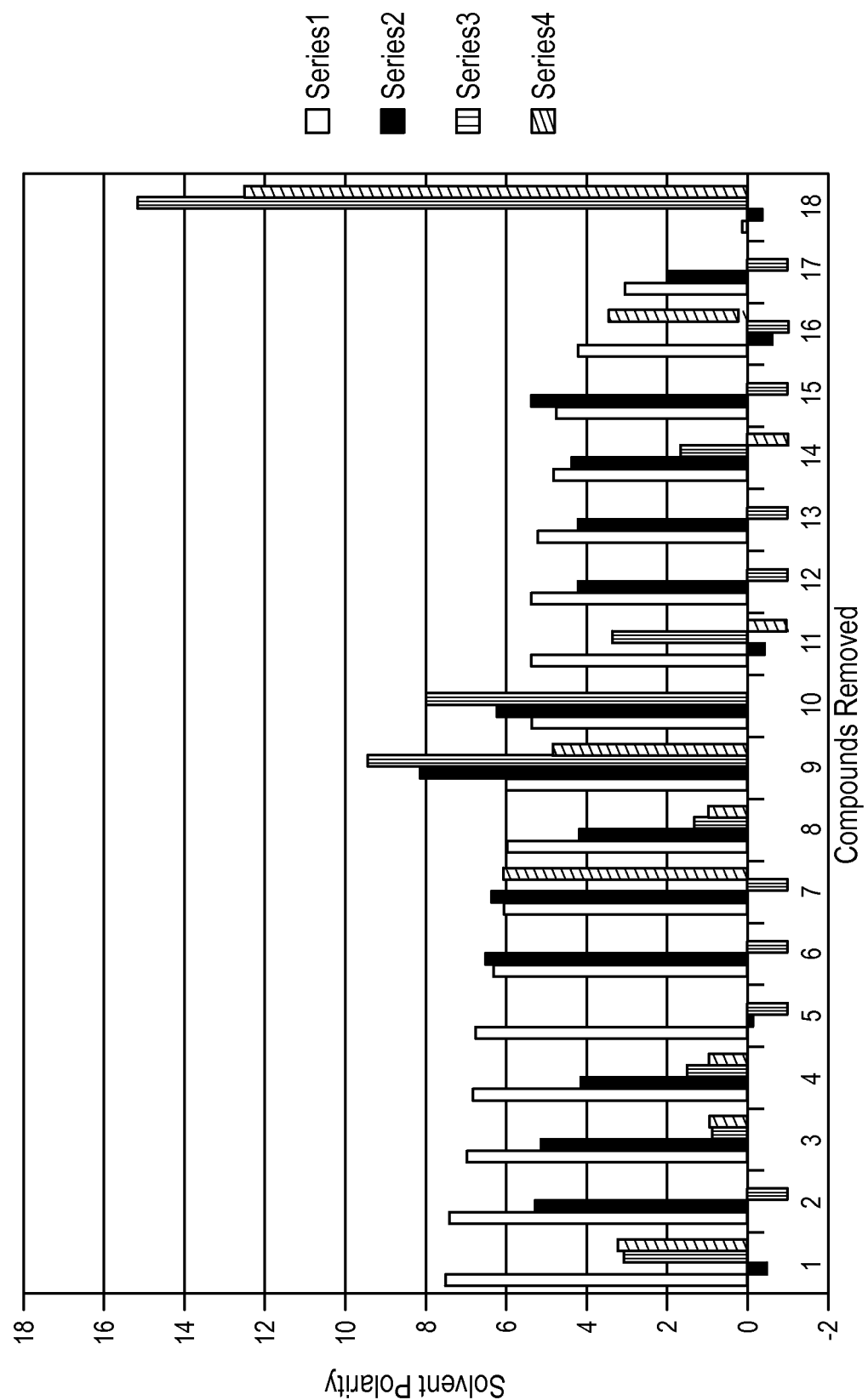
FIG. 5 is a plot of compounds showing increases in series phase 1 and 2 due to release by de-emulsification, phase inversion and wetting which are effectively treated in series phase 2 and 3.

FIG. 5 illustrates a final set of 18 compounds which show an immediate increase in headspace concentration after completion of Phase 1, likely due to breaking of the distillation resistant azeotrope. For certain compounds, this effect continues into phases 2 and 3 as the action continues. More than half of these distillation resistant compounds show complete removal in phase 3 or 4 as the solvent polarity is decreased and wetting characteristics are modified. It should be emphasized that these compounds are unreactive and cannot be removed by conventional distillation other than with costly waste of solvent in multiple distillation steps. They are effectively removed and or converted at low cost with the process of the present disclosure.

While cellulosic ethanol is not readily available for testing, laboratory evaluation of the preferred embodiment of the present disclosure suggests direct applicability for lignin-derived cellulosic ethanol treatment in addition to treatment of corn or grain ethanol. This includes wood, paper, switch grass, algae and field residues.

Distillers will find that the treated product of the process of the present disclosure reduces costly maintenance of molecular sieves used to dry the product, which are themselves fouled and made ineffective by contaminants not removed by distillation of the azeotrope. Example 4 above shows that these compounds are removed and/or converted by varying the wetting characteristics and solvent polarity of the system, and it is evident that residual compounds may also be removed by a final conventional distillation step having been freed of the matrix. Compounds below the limit of detection for the sensitive GC-MS Solid-Phase Micro-Extraction method are taken to be at zero concentration for illustrative purposes.

The demonstration also shows that the breaking of the azeotrope by the process of the preferred embodiment effectively releases other un-distillable compounds previously trapped in solution, leading to higher apparent concentrations when measured in the headspace.

EXAMPLE 5

Off-the shelf Georgia Moon (Johnson Distilling Company, Bardstown, Ky.), a very harsh White Whiskey derived from corn and described by some as a "novelty product" because of its rough and unpleasant aroma and taste, was treated as previously described in the preferred embodiment, but due to high congener levels was treated with a final stage step implementing energetic de-gassing of the gas saturated solution generated at the final state. The results described below can be generalized to brown or dark liquors.

In attempting to evaluate this "artificially aged" product, the previously disclosed Tyler process (U.S. Pat. No. 7,063,867) incorrectly compared the treated white whiskey Georgia Moon product to WILD TURKEY™ whiskey (itself a straight brown bourbon whiskey), consistently and impossibly rating the products equivalent in taste, color and aroma. The Tyler process attempted to oxidize a raw white whiskey, and this process was not developed for congener conversion/removal. Despite consistently rating the white whiskey product comparable to a brown whiskey, Tyler also failed to perform any before and after testing of the Georgia Moon, as done for the present embodiment and as shown below. This process has not been adopted by the distiller for their product.

Four tasters assessed the product resulting from the process herein to have been improved to a degree comparable to the better white whiskeys. Specifically, GC-MS analysis showed that twenty three congeners or contaminant compounds showed measureable reductions in concentration. Six objectionable congeners and contaminants were completely removed (i.e. not detected after treatment).

Nineteen new flavor compounds were created, mostly soft esters of the initial harsh congeners, a key benefit of the process. Some congeners which are objectionable fermentation by-products were reduced in concentration:

Very high concentrations of highly objectionable fusel oils were reduced by 88%; some being completely removed and other portions being esterified. Emulsion breaking resulted in hydrophobic oil droplets and headspace increases in certain compounds, emphasizing the need for additional treatment optimization. For this reason, some compounds appeared to increase in concentration on SPME headspace analysis following treatment. Changes in certain compounds are noted below:

2-methyl-1-propanol was reduced to 4% of the initial concentration;

3-methyl-1-butanol (a fusel oil) was reduced to 11% of the initial concentration;

2-methyl-1-butanol (a fusel oil) was reduced to 13% of the initial concentration;

Ethyl acetate was reduced to 15% of the initial concentration;

1-propanol was reduced to 25% of the initial concentration;

Acetaldehyde was reduced to 31% of initial concentration;

Butanoic acid ethyl ester was reduced to 81% of the initial concentration;

Capryic acid, isobutyl ester was reduced to 87% of the initial concentration; and Acetic acid heptyl ester was reduced to 91% of the initial concentration.

The following objectionable taste and odor compounds and congeners, undesirable in corn whiskey, were ejected from the system and were subsequently found in a −78 degree C. cold trap at the system outlet containing pure ethanol (Table 4).

TABLE 4

| Trapped Removed Compound | Odor/Taste |
|---|---|
| Hydrogen Sulfide | extremely foul at extremely low concentrations |
| 1-propanol or 1-hydroxyacetic acid ethyl ester | a higher alcohol and a fermentation by-product |
| 2-methoxyethanol or ethyl carbonic acid, methyl ester | off-flavors/odors |
| 2,3-hydroxypropanol or 1,3-dihydroxy-2-propanone | off-flavors/odors |
| ethyl acetate | pear flavor |
| 1-Propanol, 2-methyl or formic acid methyl ester | a higher alcohol and a fermentation by-product |
| 2-bromoethanol | sweet, fruity odor |
| the fusel oils: 3-methyl-1-butanol 2-methyl-1 butanol | off-flavors/odors |
| Cyclobutanone, 2,3,3-trimethyl | industrial solvent |
| 2-Octenal, (E) | off-flavors/odor |
| 1,5-Pentanediol, 3-methyl- Di-n-propyl ether or 2-Nonenoic acid | off-flavors/fatty odor |
| 1-Propanol, 3-ethoxy-(S)-(+)- 1,2-Propanediol or Butane, 1,1-diethoxy- or 3-Pentanol, 3-ethyl-2-methyl- | off-flavors/odor |
| fusel oil esters: | banana odor |
| 1-Butanol, 3-methyl-, acetate 1-Butanol, 2-methyl-, acetate | sweet fruity apple-banana odor |
| Styrene | sweet odor, very unpleasant at high concentrations |
| Hexanoic acid, ethyl ester or Pentanoic acid, 4-methyl-, ethyl ester | fatty, waxy, cheesy odor of goats and other barnyard animals |
| Octanoic acid, ethyl ester | slightly unpleasant, rancid smell |
| 2-Ethylacridine | acrid odor |

Congeners conventionally removed by distillation, in preparing Grain Neutral Spirits (GNS) for vodkas, for example, include propanol and fusel oils, consisting of volatile organic acids, higher alcohols, aldehydes, ketones, fatty acids and esters. These undesirable and costly to remove fermentation by-products pose major technical challenges for conventional distillation. The fusel compounds of primary interest to an ethanol producer of GNS include amyl alcohols (isomers of $C_5H_{12}O$ such as isoamyl alcohol), 1- and 2-propanols, butanols (such as n-butanol, isobutanol) and other volatile compounds.

Figure 6:
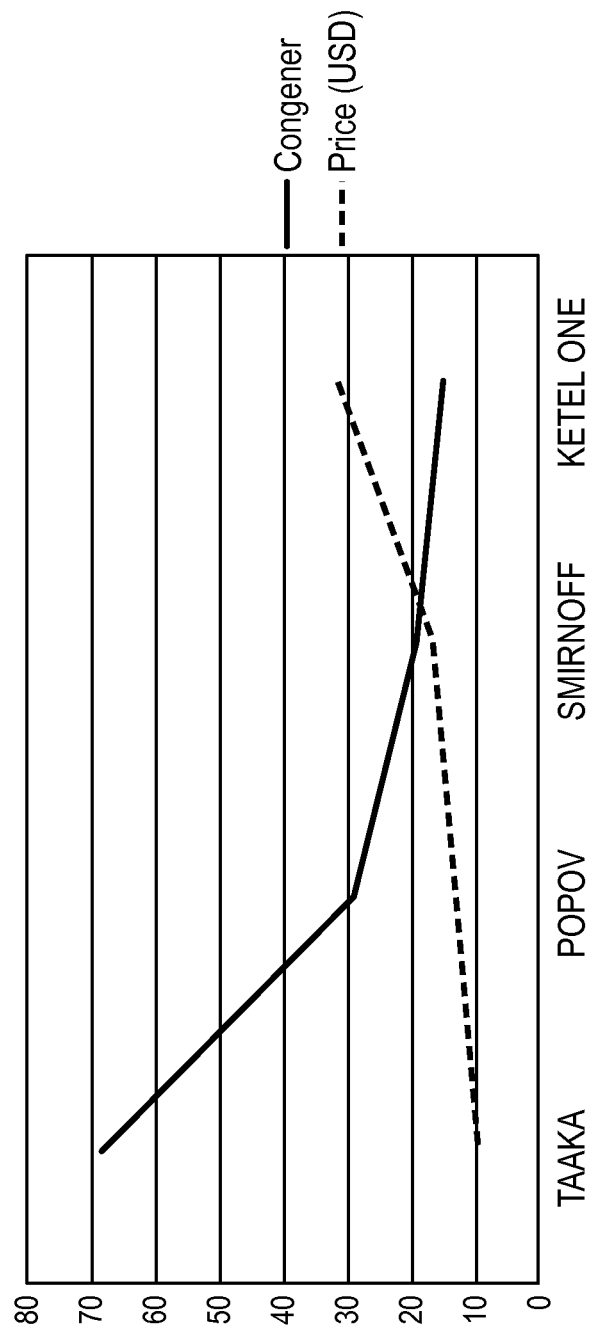
FIG. 6 is a comparison chart illustrating an inverse relationship between congener levels and price (in US dollars) of alcohol beverages.
Figure 7:
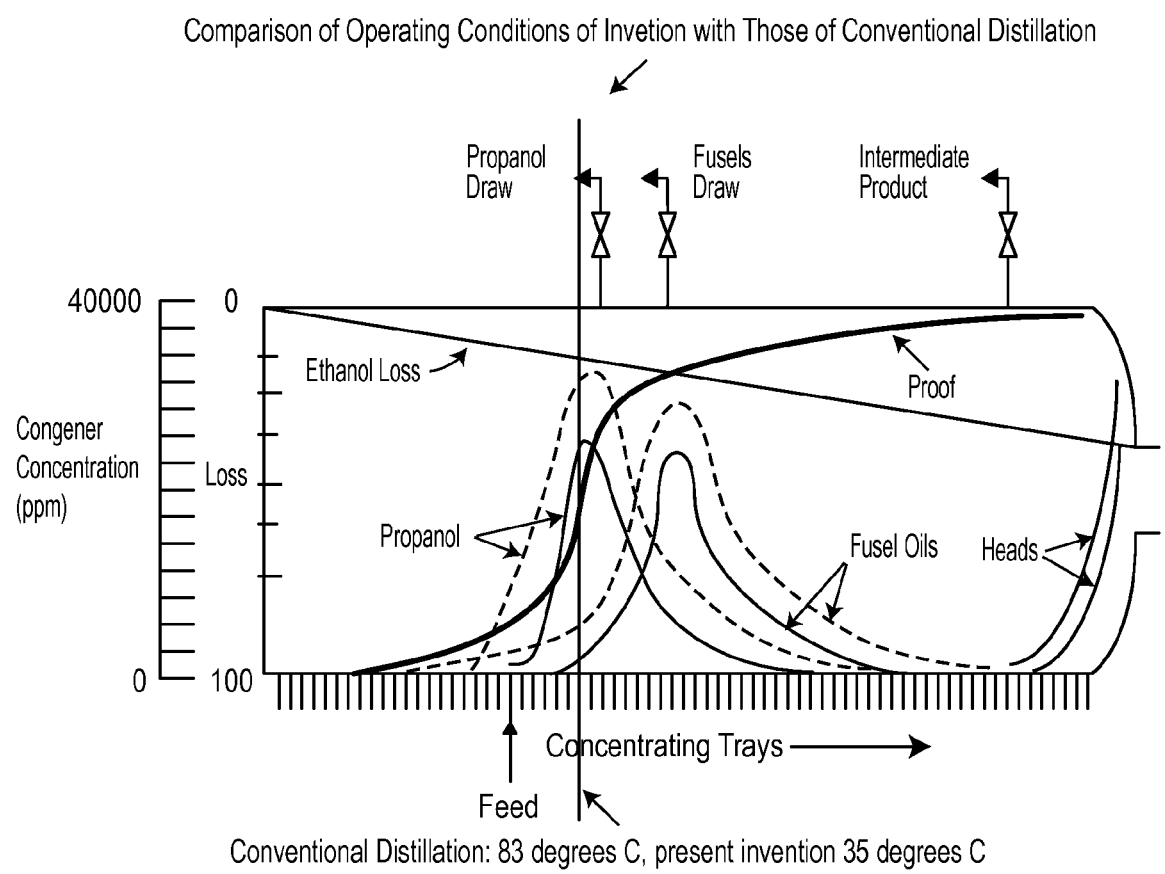
FIG. 7 is a plot of congener concentration (in parts per million) and congener reduction (loss) achieved through conventional distillation as compared to the process of the present disclosure.

Turning to FIGS. 6 and 7, it is known that distillation processes remove impurities from alcoholic beverages and the more times the distillation process is repeated, the more effective congeners can be removed. However, repeated distillations come at significant costs, in terms of power requirements and loss of volume of alcohol due to evaporation from repeated heating. As illustrated in FIG. 6, the approximate level of congeners in the alcohols (represented by a solid line on the graph) TAAKA™ brand vodka, which is four-times distilled, POPOV™ vodka, which is three-times distilled, SMIRNOFF™ vodka, and KETTLE ONE™ vodka, which is seven-times distilled, and the price of the same volume of the various vodka brands (represented by a dot-dashed line on the graph), are plotted for comparison. As can be appreciated from the graph, while there is a positive correlation between the amount of congeners removed from an alcohol and the number of distillations, there is generally an inverse correlation between the number of distillations of an alcohol and its price per liter. As illustrated in the graph of FIG. 7 (adapted from J. E. Murtagh, Murtagh and Associates, Winchester, Va.), the graph illustrates the decrease of congener concentrations during conventional distillation as a function of the number of trays in the rectifier column, the method of the present disclosure results in significantly more efficient congener removal.

In the graph of FIG. 7, the stage-related concentrations are shown, and the total amount of propanol or fusel oils may be understood to be the area under the respective curves for these compounds. "Heads" represent contaminated ethanol which co-distills with the removed congeners, and reflect ethanol product losses in conventional distillation. Superimposed on the graph is the likely ethanol loss required to produce a vodka quality GNS, by some estimates nearly 30% of product at the end of multiple distillation steps.

It is evident from the graph that for 40% ethanol distilled by boiling at 83 degrees Celsius in the conventional distillation, only a fraction of the propanol (approximately 10%) and very little of the fusel oil (approximately 1%) have been successfully removed. Further, more acceptable, but still poor and incomplete, removal of these congeners will require that the system be driven to 100 degrees Celsius, with concurrent ethanol product losses exceeding 30%.

By contrast, the apparatus and process of the present disclosure result in propanol and fusel oil removals of 100% and 50%, respectively, at just 35 degrees C. (a full 50 degrees cooler than conventional distillations), with ethanol losses of approximately 0.5 (one-half) percent, a dramatic reduction in energy consumption and product losses. In fact, as shown in data previously presented, the reductions in congener yielded by the apparatus and process of the present disclosure are the same at 35 degrees as accomplished by conventional distillation at 79 degrees C. This improvement represents the ability of the method and apparatus of the present disclosure to eliminate a large fraction (likely as many as ⅓ or more) of the rectification trays required by conventional distillation, a substantial savings in energy and time. This elimination of distillation steps will result immediately in an estimated reduction of ethanol product losses from 30% to 15% for the preparation of GNS for a top-shelf vodka, before process optimization and scale-up.

Moreover, off-gassed congeners of the method and apparatus of the present disclosure are not associated with large volumes of ethanol lost to the head, and can therefore be captured and treated (thermally decomposed as in conventional distillation) in concentrated form for pollution control, without re-distillation or separation.

EXAMPLE 6

Drying of natural gas is usually carried out by mixing the natural gas with a glycol composition (e.g., triethylene glycol (TEG), diethylene glycol (DEG), ethylene glycol (MEG), and tetraethylene glycol (TREG)) to remove water from the gas component for storage or shipment through a pipeline. Ideally water-free glycol is contacted with the wet natural gas stream and removes water from the natural gas by physical absorption. During the drying process, the dry natural gas leaves the top of the absorption column and is fed either to a pipeline system or to a gas plant. The glycol is absorbed in absorbers (tray columns or packed columns) and eventually is thermally regenerated to remove excess water and regain the high glycol purity and reused in the natural gas drying process. Such drying of glycols is usually carried out at high temperatures with significant energy input required.

A proof of concept demonstration was undertaken by implementing the process in the removal of one component of a complex water-alcohol azeotrope (actually a glycol, itself a polyalcohol, and a diol) in which 4 water molecules are thought to be hydrogen bonded to a single glycol molecule, and water is also hydrogen bonded to the diol. Because of the diol-glycol-water azeotrope, this mixture is very difficult to dry under typical conditions, and must be boiled at high temperatures which causes undesirable reactions and consumes large amounts of energy. Furthermore, the mixture has no economic value to the end user when hydrated during storage due to exposure to moisture during filling and transfer operations.

A proprietary mixture consisting principally of 30-60% of tripropylene glycol and 13-30% of 1,3-butanediol (trademark RUBIBLEND™, use in polyurethane manufacture) was placed in the standard reactor described in the apparatus section. The mixture had an initial water content of 0.3% water by weight as determined by Karl Fisher coulometric titration. Some mixtures of this type have water contents exceeding 0.5% water by weight after storage.

Figure 8:
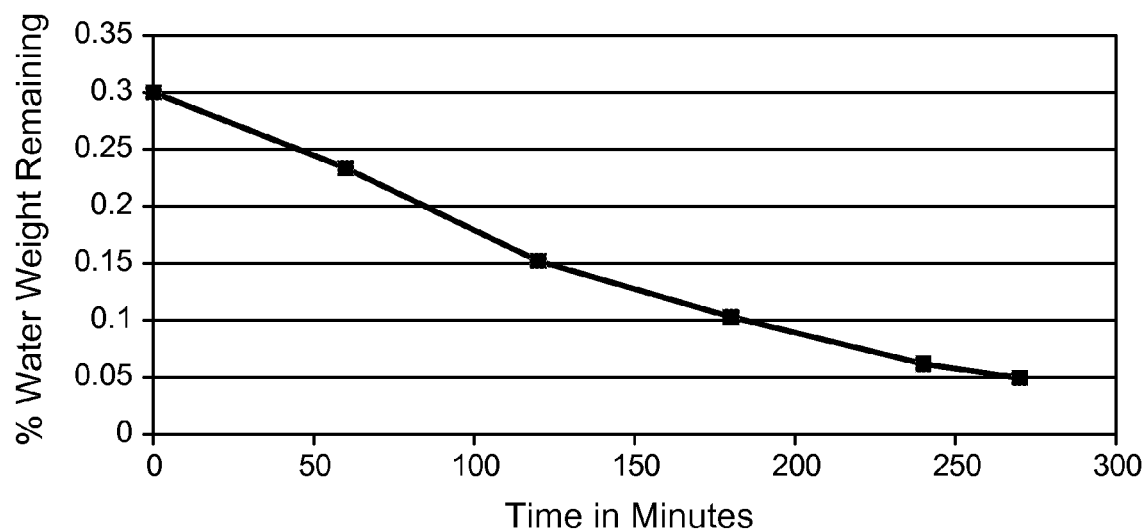
FIG. 8 is a graph showing % Water Weight Remaining vs Time in Minutes for dehydration of a glycol composition.

Temperatures and pressures were calculated such that 1) the reduced-pressure boiling point of water was met, 2) reduced-pressure-boiling point of the low boiling 1,3-butanediol component was not exceeded, and 3) the flash point of the 1,3-butanediol was not exceeded. Treatment of the sample took place at just 60 degrees C., with energy inputs provided largely by the energetics system. The apparatus was operated identically as described in the apparatus section, with the exception that during each 5 minute interval, a 2.5 minute gas saturation phase without energetics was followed by a gas-extraction phase with energetics only. This procedure results in optimum extraction of water. Results are shown in Table 5 and FIG. 8, and demonstrate that the process and apparatus described herein can also efficiently dehydrate glycol solutions at low temperatures over a short time frame.

TABLE 5

% Water Weight Removal by Process vs Time in Minutes

| Time (min) | % Water by weight Karl-Fisher |
|---|---|
| 0 | 0.30 |
| 60 | 0.23 |
| 120 | 0.15 |
| 180 | 0.10 |

TABLE 5-continued

% Water Weight Removal by Process vs Time in Minutes

| Time (min) | % Water by weight Karl-Fisher |
|---|---|
| 240 | 0.06 |
| 270 | 0.05 |

Treatment costs, excluding capital equipment and considering energetics and gases alone, are as low as five cents per gallon of product when treating to the 0.2% water level required by the end user, e.g., in approximately 60 minutes using the process described herein. The natural gas industry currently has approximately 36000 units which implement triethylene glycol drying of natural gas, and energy intensive distillation units are required for its recovery. The process disclosed herein provides a low-cost substitute for glycol dehydration and will have extensive industrial uses.

While various embodiments and examples are presented above of the apparatus and process of the present disclosure, it will be understood by those of ordinary skill in the art that variations may be made thereto which are considered within the scope of the appended claims.

What is claimed is:

1. Method for treating an alcohol-water medium comprising at least one of removing and or converting congeners in the alcohol-water medium to forms less objectionable and metabolically impactful to humans, and for treating previously un-distillable contaminated ethanol for successful conventional distillation, comprising:
   [a] placing the alcohol-water medium to be treated within a vessel, with the alcohol-water medium occupying a portion of the volume of the vessel and a vapor space occupying a remaining portion of the vessel, and sealing the vessel;
   [b] providing a flow of gas in contact with the alcohol-water medium in the vessel;
   [c] pulling a vacuum within the vessel thereby drawing the flow of gas through the alcohol-water medium to the vapor space, thereby creating bubbles while maintaining a pre-selected pressure within the vessel;
   [d] subjecting the alcohol-water medium to acoustic energy while the alcohol-water medium is in the vessel and while the gas is being drawn through the alcohol-water medium, the alcohol-water medium being subjected to acoustic energy at a specific frequency and amplitude suitable for cavitation in the alcohol-water medium to form micelles, thereby forming congener bearing microcapsules;
   [e] rapidly drawing the congener bearing gases from the alcohol-water medium;
   [f] trapping and/or capturing all expelled congeners; and
   [g] optionally tuning the polarity and wetting characteristics of the alcohol-water medium during steps [c] through [e] such that congeners with varying thermodynamic properties are selectively treated, thereby providing a treated alcohol-water medium.

2. The method of claim 1, wherein there is less than 25% alcohol loss during performance of an iteration of the method.

3. The method of claim 1, wherein the vapor space has a temperature of 35° C. ±3° C.

4. The method of claim 1, wherein the acoustic energy is applied for less than about 60 minutes.

5. The method of claim 4, wherein the acoustic energy is applied for less than 50, 40, 30 or 20 minutes.

6. The method of claim 1, wherein the acoustic energy applied is between about 1 Hz and 10 mHz.

7. The method of claim 6, wherein the amount of alcohol lost is less than about 20%, 15%, 10% or 5%.

8. The method of claim 1 wherein the level of alcohol congeners removed is greater than the levels removed over 1, 2, 3, or 4 rounds of a standard alcohol distillation process.

9. The method of claim 1, wherein at least 50% of congeners are removed.

10. The method of claim 9, wherein at least 50% of fusel oils are removed.

11. The method of claim 1 wherein the alcohol-water medium is a glycol composition.

12. The method of claim 11, wherein the treated glycol composition comprises less than 0.2% water.

13. The method of claim 1, wherein the acoustic energy applied is between about 12,000 Hz and 20,0000 Hz.

\* \* \* \* \*